United States Patent [19]

Yamakawa et al.

[11] Patent Number: 4,596,995
[45] Date of Patent: Jun. 24, 1986

[54] DOT PRINTER HAVING MEANS FOR CORRECTING INTENSITY VARIATIONS

[75] Inventors: Tadashi Yamakawa; Hideaki Furukawa, both of Yokohama, Japan

[73] Assignee: Canon Kabushiki Kaisha, Tokyo, Japan

[21] Appl. No.: 620,673

[22] Filed: Jun. 14, 1984

[30] Foreign Application Priority Data

Jun. 24, 1983 [JP] Japan .............................. 58-113795
Jun. 24, 1983 [JP] Japan .............................. 58-113796
Jun. 24, 1983 [JP] Japan .............................. 58-113797

[51] Int. Cl.$^4$ ............................................. H04N 1/24
[52] U.S. Cl. ..................................... 346/160; 358/302
[58] Field of Search ........................... 346/160, 107 R; 358/298, 302

[56] References Cited

U.S. PATENT DOCUMENTS 4,455,578  6/1984  Fearnside .......................... 358/302

Primary Examiner—E. A. Goldberg
Assistant Examiner—Arthur G. Evans
Attorney, Agent, or Firm—Fitzpatrick, Cella, Harper & Scinto

[57] ABSTRACT

A dot printer has an LED array printer head consisting an array of LEDs, drivers for independently driving the LEDs, and time control circuits for controlling ON or OFF times of the LEDs by energizing the drivers in accordance with image data and correction data stored in a memory. The LEDs can be divided into blocks which can be sequentially driven. Variations in mechanical and electrical characteristics of the LEDs are corrected to allow formation of a high-resolution image or a halftone image.

13 Claims, 15 Drawing Figures

DOT PRINTER HAVING MEANS FOR CORRECTING INTENSITY VARIATIONS

BACKGROUND OF THE INVENTION

1. Field of the Invention

The present invention relates to a dot printer for printing characters, halftone images and the like with small pixels (dots).

2. Description of the Prior Art

Various recording element sections or printer heads for use in dot printers that form output images with dots are known. Examples of such heads include a wire dot printer head, an electrostatic printer head, an ink-jet printer head, a thermal printer head, an LED (light emitting diode) array printer head and the like. An LED array printer head having 8 to several tens of elements per mm as the dot generating elements is receiving the most attention due to its extremely high resolution. When this head is used in place of an optical scanning mechanism in a conventional electrophotographic copying machine, a printer can be realized in which an array of LEDs is selectively turned on in accordance with a video signal to form an electrostatic latent image on a surface of an adjacent photosensitive body and a visualized image is obtained through a transfer process of the image onto a transfer sheet. In a printer of this type, a portion corresponding to the ON LEDs can be formed into a black or white image portion by changing the charging conditions or toner.

FIG. 1 shows a block diagram of a conventional LED array printer head driver. The driver performs main scanning for electrically scanning the array of LEDs and subscanning for moving a photosensitive surface in a direction perpendicular to the main scanning direction so as to print out an image. Referring to FIG. 1, a data enable signal (DATA-EN) 7 enables main scanning and defines an interval in which a video signal (VIDEO) 5 is effectively printed out. More specifically, when the data enable signal 7 is at level "1", a counter 1 and a decoder 4 are enabled. The counter 1 starts counting main scanning clock signals (CLK) 2 and produces a count output signal 3. The decoder 4 decodes the count output signal 3 from the counter 1 and produces latch pulse signals $4_1$ to $4_n$ in the order of values 0 to (n−1) of the count output signal 3. The video signal 5 is commonly supplied to data input terminals D of latch flip-flops (to be referred to as latches hereinafter) $FF_1$ to $FF_n$. The latch pulse signals from the decoder 4 are sampled in a predetermined order and are stored in the latches $FF_1$ to $FF_n$. N light-emitting diodes (to be referred to as LEDs hereinafter) $LED_1$ to $LED_n$ are arranged adjacent to each other to constitute an LED array printer head 6. Drivers $D_1$ to $D_n$ for individually driving the LEDs $LED_1$ to $LED_n$ control the ON/OFF timing of the currents flowing thereto. For example, when the latch $FF_1$ has stored a dot pixel signal of level "1", the driver $D_1$ causes a current to flow to the $LED_1$ and so turn it on. On the other hand, when the latch $FF_1$ has stored a dot pixel signal of level "0", the driver $D_1$ blocks current supply thereto to turn it off. Resistors $R_1$ to $R_n$ control the currents flowing to the $LED_1$ to $LED_n$. In a head of this configuration, when printing in the main scanning direction is performed, the photosensitive surface is also scanned in the subscanning direction. In this case, the latches $FF_1$ to $FF_n$ hold the stored pixel signals up to the next main scanning latch timing. Therefore, the signal holding time is the same in all LEDs. When subscanning is performed for a predetermined length of time during such signal holding time, an electrostatic latent image of one line is formed on the photosensitive surface. When the image is developed and is transferred onto a recording paper sheet, a visible image is formed which consists of black portions exposed to light from the LEDs and white portion not exposed to such light.

However, even if the same current is made to flow to the LEDs, there are variations in the light intensities of the respective LEDs. Such variations of LEDs are unavoidable at the present moment. Therefore, if the LEDs are driven in the same manner as in conventional techniques, the printed image has density irregularities due to such variations in the light intensity or luminance of the LEDs. This phenomenon occurs in various types of printer head including an LED array printer head. For example, in wire dot printers, which have recently become popular, a similar irregularity in the printed image occurs due to variations in the wear of the pin head mechanism and the electrical characteristics of the actuator. In a wire dot printer, the dot pin number is small, and the output image need not satisfy too high a resolution requirement. For this reason, the problem of irregular density of the printed image has been frequently solved by adjustment by a trained operator. However, in the case of applications which require a great number of output dots and a high resolution of the printed image, this problem cannot be easily solved.

A dot output device expresses an image by a combination of a number of output dot pixels. This means that a high-resolution image requires a great number of dot output elements. Furthermore, in order to provide gradation or gray levels with a dot output device, one pixel conventionally consists of a plurality of dot pixel outputs. The black dot output density within the pixel is variably controlled to provide a pseudo-halftone effect. For this reason, an image obtained by this method cannot have a high density and has not been satisfactory.

SUMMARY OF THE INVENTION

The present invention has been made in consideration of this and has as its object to provide a dot printer which is capable of printing images, characters and the like of excellent quality.

It is another object of the present invention to provide a dot printer which can correct variations in mechanical and electrical characteristics in a dot pixel output section.

It is still another object of the present invention to provide a dot printer which can easily correct variations inherent in mechanical or electrical characteristics of a dot pixel output section or variations in such characteristics which are caused over time.

It is still another object of the present invention to provide a dot printer which can produce a high-density dot output image with a gray level expression and which is inexpensive.

It is still another object of the present invention to provide a dot printer which allows control of halftone image reproduction for each dot output element and which can correct variations in driving characteristics of each dot output element.

It is still another object of the present invention to provide a dot printer suitable for a printer head consisting of a plurality of light-emitting elements.

It is still another object of the present invention to provide a dot printer which has a high resolution.

The above and other objects and features of the present invention will become apparent from the following description taken in conjunction with the accompanying drawings.

DETAILED DESCRIPTION OF THE PREFERRED EMBODIMENTS

The preferred embodiments of the present invention will now be described with reference to the accompanying drawings.

FIRST EMBODIMENT

Figure 2:
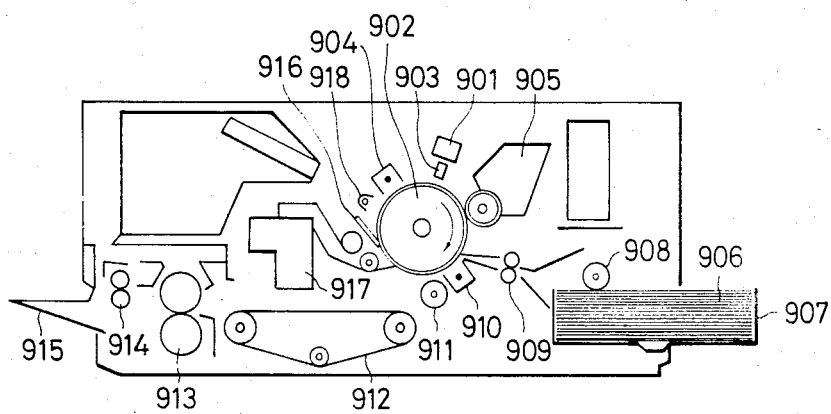
FIG. 2 is a sectional view showing the construction of an image recording apparatus to which the present invention can be applied.

FIG. 2 shows the construction of an image recording apparatus to which the present invention can be applied. An LED array printer head 901 has a plurality of LEDs and operates in accordance with recording information supplied from an external device (not shown). A rotatable drum 902 has a photosensitive layer formed on its outer surface. A rod array lens 903 focuses light emitted from the LEDs of the printer head 901 onto the photosensitive surface of the drum 902. A corona charger 904 precharges the photosensitive layer of the drum 902. A developing unit 905 develops an electrostatic latent image formed on the drum 902 with toner. A cassette 907 stores a number of transfer sheets 906. A pickup roller 908 picks up the uppermost transfer sheet 906 from the cassette 907. Register rollers 909 serve to register the leading edge of the transfer sheet 906 with that of the image on the drum 902. A transfer charger 910 transfers the developed image on the drum 902 onto the transfer sheet 906. A separation roller 911 separates the transfer sheet 906 with the transferred image thereon from the drum 902. A belt 912 conveys the separated transfer sheet 906 to a fixing section. Fixing rollers 913 at the fixing section fix the image on the transfer sheet 906, and exhaust rollers 914 exhaust the transfer sheet 906 having the fixed image thereon onto a tray 915. A blade cleaner 916 cleans off any residual toner on the drum 902 from which the image has been transferred. The cleaned toner is recovered into a container 917. A lamp 918 removes residual charge on the drum 902.

The mode of operation of the printer according to this embodiment will now be described. When a main switch (not shown) is depressed, a motor for driving the drum 902 is turned on. The lamp 918 and the corona charger 904 are turned on. Then, the residual toner, residual charge or memory on the drum surface are cleaned off. When the fixing rollers 913 reach a fixing temperature, a recording enable signal is supplied to an external device which has requested printing.

When the recording information is supplied from the external device, the LEDs of the LED array printer head 901 are turned on, and the emitted light exposes the surface of the drum 902 through the rod array lens 903. When the surface of the photosensitive layer of the drum 902 which has been charged by the charger 904 reaches the exposure position, the charge on this surface is removed by the light from the LED array printer head 901 and an electrostatic latent image is formed thereon. The latent image is applied with toner by the developing unit 905 and is visualized thereby. The visualized image is transferred onto the transfer sheet 906 by the transfer charger 910. The transfer sheet 906 has been picked up from the cassette 907 by the pickup roller 908 and is passed through the transfer region at the same speed as the peripheral speed of the drum 902 by the register rollers 909.

The transfer sheet 906 having the image thereon is separated from the drum 902 by the separation roller 911, is conveyed to the fixing rollers 913 for fixing the image thereoron, and is exhausted onto the tray 915 by the rollers 914.

The toner remaining on the drum 902 from which the image has been transferred is cleaned by the blade cleaner 916. The drum 902 is then in the standby state for the next image forming cycle.

Figure 1:
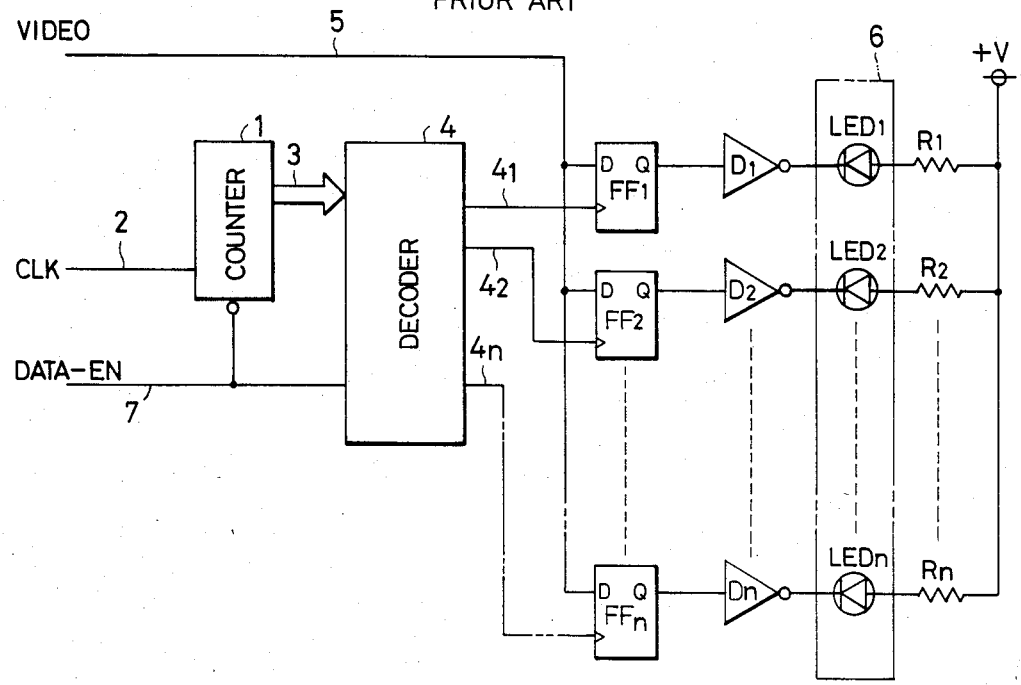
FIG. 1 is a block diagram of a conventional LED array printer head driver.
Figure 3:
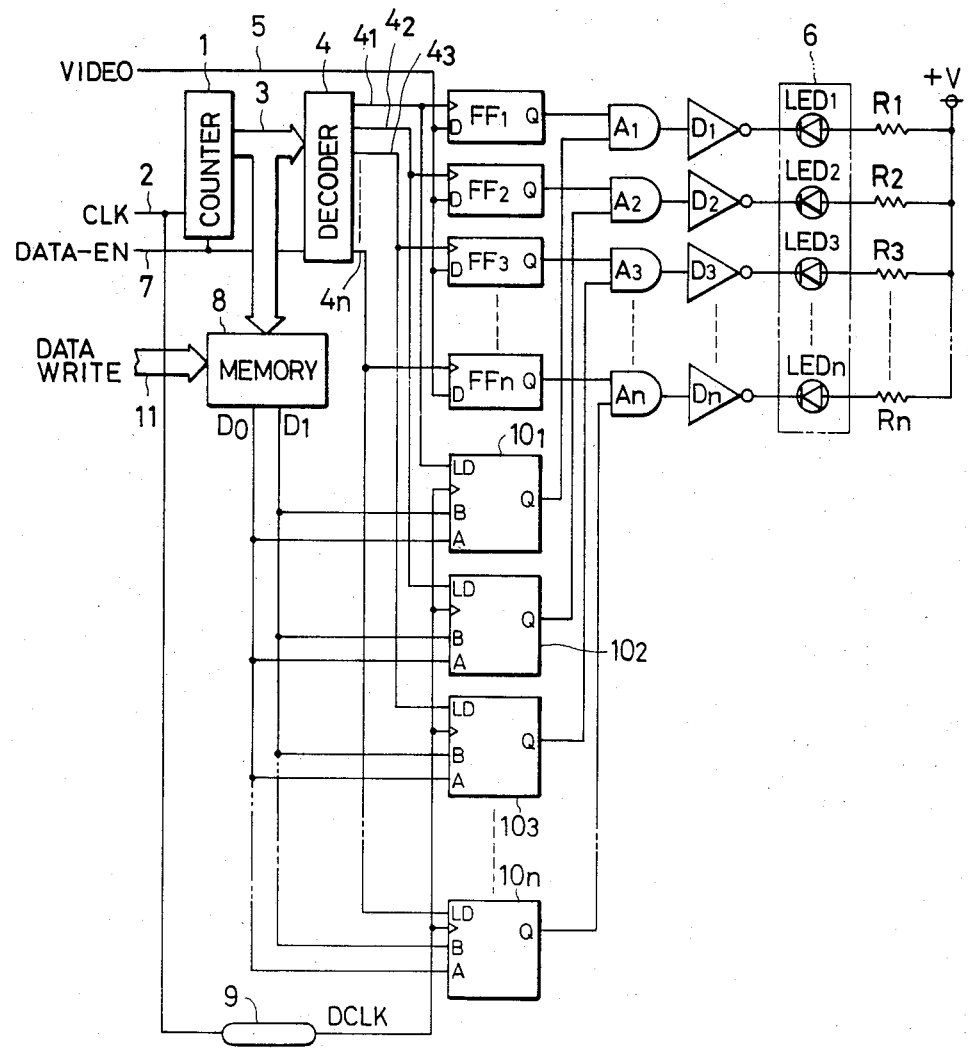
FIG. 3 is a block diagram of an LED printer head driver according to a first embodiment of the present invention.
Figure 5:
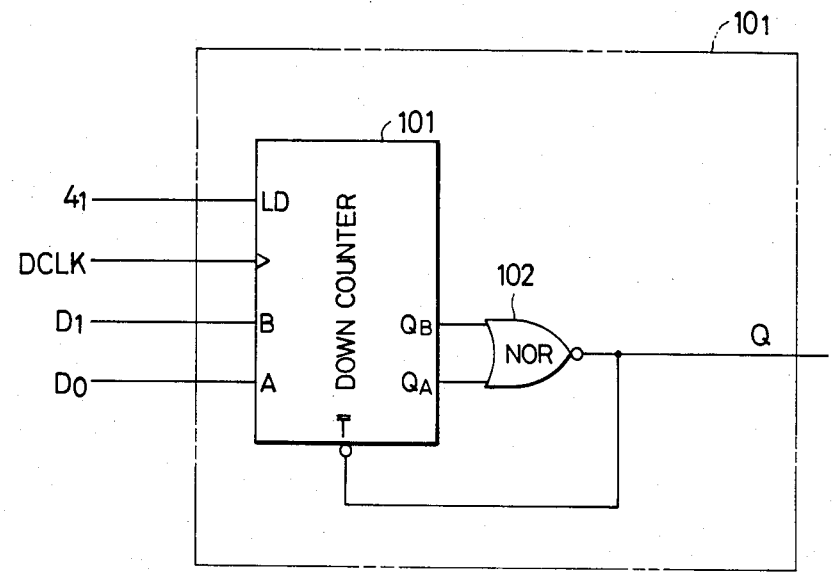
FIG. 5 is a block diagram of a time control circuit shown in FIG. 3.

FIG. 3 is a block diagram of an LED array printer head driver according to this embodiment. The same reference numerals as in FIG. 1 denote the same parts in FIG. 3, and a detailed description thereof will be omitted. Referring to FIG. 3, a memory 8 stores correction data of each LED and produces 2-bit data $D_0$ and $D_1$ for time control in accordance with an address input, i.e., an output signal 3 (count) of a counter 1. A delay circuit 9 delays a main scanning clock signal (CLK) 2 for a time interval during which the data $D_0$ and $D_1$ from the memory 8 are satisfactorily stabilized. Time control circuits $10_1$ to $10_n$ individually control the ON times of $LED_1$ to $LED_n$ through AND gates $A_1$ to $A_n$. The individual ON times of the $LED_1$ to $LED_n$ are obtained such that the common readout data $D_0$ and $D_1$ from the memory 8 are sequentially preset in the time control circuits $10_1$ to $10_n$ in accordance with latch pulse signals $4_1$ to $4_n$. FIG. 5 shows the circuit configuration of the time control circuit $10_1$.

The remaining time control circuits $10_2$ to $10_n$ have the same circuit configuration as that of the time control circuit $10_1$. Referring to FIG. 5, a down counter 101 receives the readout data $D_0$ and $D_1$ from the memory 8 for initialization of a preset count thereof, the latch pulse signal $4_1$ for selectively biasing the initialization, and a delayed clock signal DCLK for providing an actual initialization timing after the readout data is sufficiently stabilized. The delayed clock signal DCLK also serves as a clock signal when the down counter 101 counts down.

As long as the preset count in the down counter 101 is not "0", a signal of level "1" is produced at one of output terminals $Q_A$ and $Q_B$ of the down counter 101. At this time, an output signal from a NOR gate 102 is at level "0", and is produced as an output signal Q from the time control circuit $10_1$ and biases a down-count terminal $\overline{T}$ of the down counter 101. Then, from the next delayed clock signal DCLK, the down counter 101 starts counting down. When the count of the down counter 101 reaches "0", the signals on the output terminals $Q_A$ and $Q_B$ both go to "0", and an output signal from the NOR gate 102 is at level "1". At this time, the down-count terminal $\overline{T}$ of the down counter 101 is de-energized to stop counting. The purpose of these time control circuits is to convert the readout data $D_0$ and $D_1$ of the memory 8 into a time duration. For this reason, the circuit comprises a presettable counter circuit as a suitable circuit for serving this purpose. However, the time control circuit may also comprise a parallel-serial converter.

Figure 4:
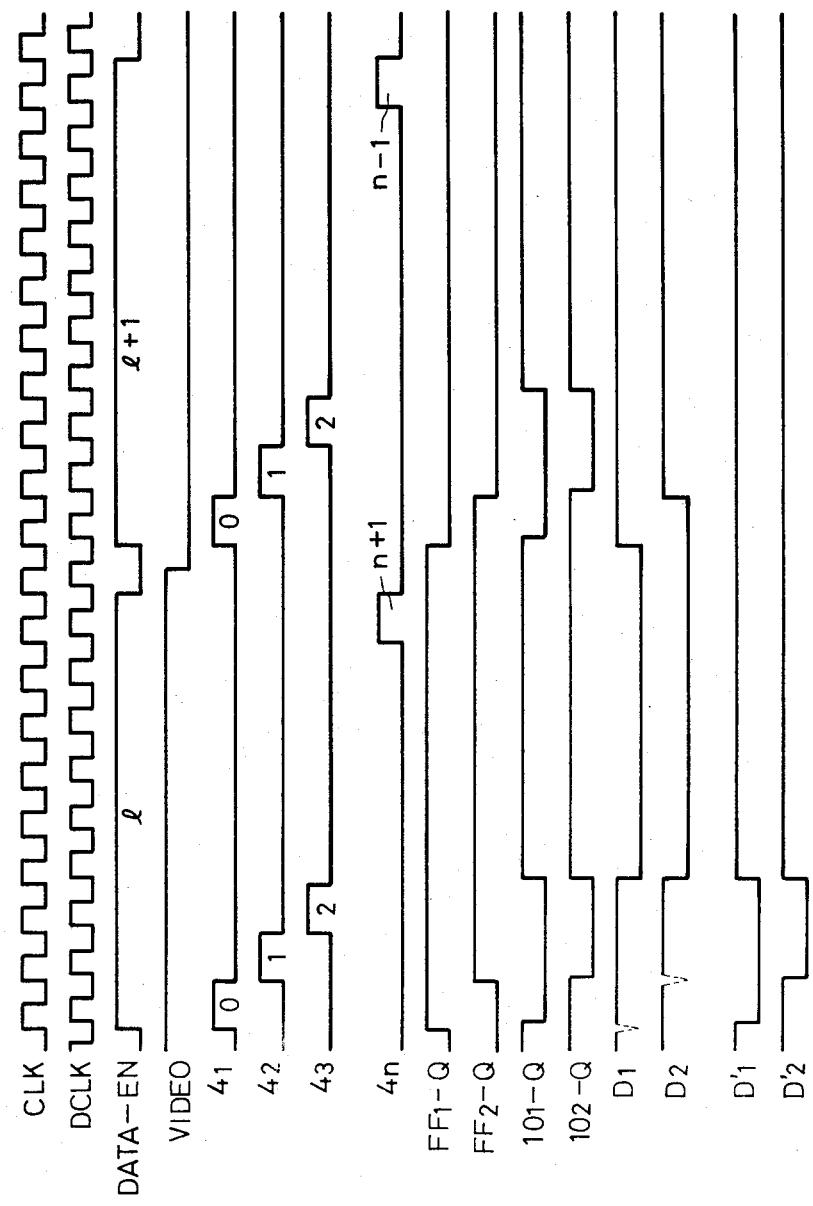
FIG. 4 is a timing chart for explaining the mode of operation of the circuit shown in FIG. 3.

FIG. 4 is a timing chart for explaining the mode of operation of the embodiment shown in FIG. 3. FIG. 4 shows the phase relationship between the main scanning clock signal (CLK) 2 and the delayed clock signal DCLK obtained by delaying the signal (CLK) 2 by a predetermined delay time.

Main scanning is performed in synchronism with a data enable signal (DATA-EN) 7, and the case of main scanning lines l and l+1 is illustrated. In the case illustrated, a video signal (VIDEO) 5 is at level "1" for the lth main scanning line to form a black line and is at level "0" for the l+1th main scanning line to form a white line parallel to the black line.

The latch pulse signals $4_1$ to $4_n$ are sequentially produced during one main scanning period. FIG. 4 also shows the relationship between the latch pulse signals $4_1$ to $4_n$ and the count of the counter 1. A description will be made below on the drive time control of the LEDs $LED_1$ and $LED_2$.

In the lth main scanning line, a latch $FF_1$ stores the video signal VIDEO at the leading edge of the latch pulse $4_1$. An output signal ($FF_1$-Q) goes to level "1" at this timing. Similarly, an output signal ($FF_2$-Q) from a latch $FF_2$ goes to level "1" at the leading edge of the latch pulse signal $4_2$. The readout data $D_0$ and $D_1$ from address 0 of the memory 8 is preset in the time control circuit $10_1$ at a time selected by the latch pulse $4_1$. The actual preset timing coincides with the leading edge of the delayed clock signal DCLK. At this timing, an output signal ($10_1$-Q) from the time control circuit $10_1$ is at level "0". Similarly, an output signal ($10_2$-Q) from the time control circuit $10_2$ is at level "0" at a time which is selected by the latch pulse signal $4_2$. In this embodiment, since the $LED_1$ has a high luminance, its initial preset value is set to be 3. Since the $LED_2$ has a luminance slightly lower than that of the $LED_1$, the initial preset count of the $LED_2$ is set to be 2. In the time control circuit, the count of the down counter 101 is decremented by 1 every time the delayed clock signal DCLK is generated following initialization. Therefore, the output signal ($10_1$-Q) from the time control circuit $10_1$ rises at the leading edge of the third delayed clock signal, and the output signal ($10_2$-Q) from the time control circuit $10_2$ rises at the leading edge of the second delayed clock signal. The output signals ($10_1$-Q) and ($10_2$-Q) are then kept at level "1" until the next initialization is performed. The AND gate $A_1$ receives the outputs from the latch $FF_1$ and the time control circuit $10_1$. Therefore, when the output signal from the latch $FF_1$ is at level "1", the output signal from the AND gate $A_1$ is limited in time by the output from the time control circuit $10_1$. While the output from the AND gate $A_1$ is at level "1", a driver $D_1$ is energized to cause a current to flow to the $LED_1$. When the output from the latch $FF_1$ is at level "0", the output signal from the AND gate $A_1$ is not limited in time by the time control circuit $10_1$. Thus, when the $LED_1$ is turned on, it emits light for a period which is shorter than the main scanning period by a time interval corresponding to three clock signals due to a high luminance thereof. However, since the $LED_2$ has a low luminance, it emits light for a period shorter than the main scanning period by a time interval corresponding roughly to two clocks.

The object of this embodiment is to obtain a uniform dot image on a photosensitive surface by individual control of ON times of light-emitting elements. If subscanning or rotation of the photosensitive drum is controlled during the main scanning period, the amount of light received per unit area of the light-receiving surface can be rendered uniform by controlling the ON times of the LEDs. When control is performed wherein subscanning is performed simultaneously as the main scanning without stopping the rotation of the photosensitive drum, a difference is produced between the sensitized areas. When this visualized image is viewed at a distance, it appears uniform in density. Referring to FIG. 4, negative spike components in the outputs from the drivers $D_1$ and $D_2$ are indicated by dotted lines. These spike signals are generated due to the control for awaiting the readout data from the memory 8 to be stabilized. Since these components generally have a very short pulse duration, they do not substantially affect the operation of the $LED_1$ to $LED_n$. However, these spike signals can be eliminated by suitable gate signals.

In the embodiment of the construction and control method as described above, the problem arising from the differences in the luminance of a plurality of light-emitting elements constituting an LED printer head is eliminated, and the quality of the visualized image is thus improved. Furthermore, it is apparent that the control method of the ON time of LEDs as described above can be applied to other types of printer head mentioned above. A data write line 11 is used to write data for correcting the irregularity in the luminance of the respective LEDs from a microcomputer (not shown) in the memory 8. However, if ROMs storing correction data for each head element are used, the data write in the memory 8 can be omitted.

Variations in various characteristics over time occur not only in an LED array printer head but also in other types of printer head mechanism or element. In view of this, in the above-mentioned embodiment, a means for correcting such variations in the characteristics may be incorporated. Such a means may comprise a memory 8, the contents of which can be easily rewritten through direct manual scanning by a write means such as a microcomputer or a DIP switch. With this arrangement, variations in characteristics over time may be corrected. Furthermore, the entire contents of the memory 8 may be subjected to a single operation such as incrementation or decrementation by one so as to change the density of the overall image while keeping the density balance at each part of the image the same.

SECOND EMBODIMENT

Figure 6:
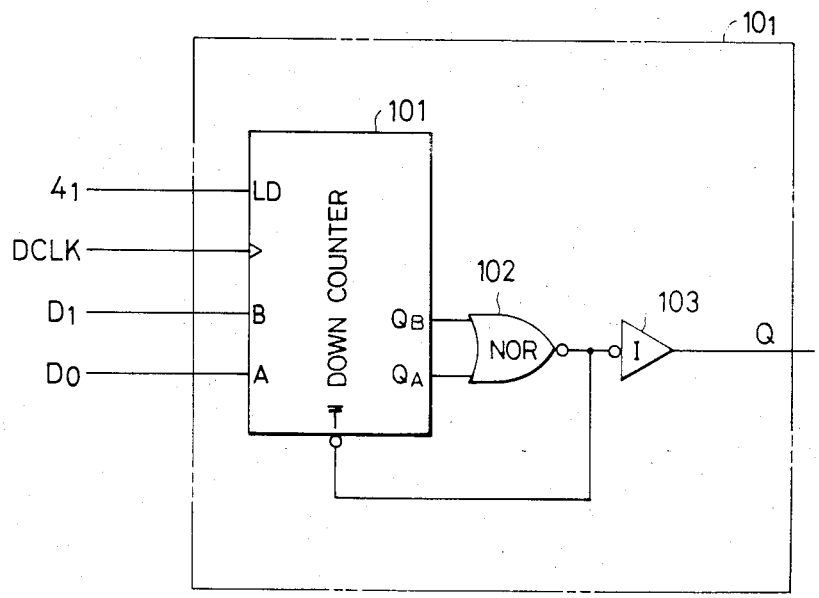
FIG. 6 is a block diagram showing another example of the time control circuit shown in FIG. 3 according to a second embodiment of the present invention.

In the second embodiment of the present invention, output signals Q from the time control circuits $10_1$ to $10_n$ shown in FIG. 3 are inverted. If the response characteristics of the photosensitive layer are sufficiently faster than the light-emitting capacity of the LEDs, control for subtracting the ON time from the main scanning period need not be performed. In other words, in this case, readout data $D_0$ and $D_1$ from the memory 8 can define the time for energizing the respective LEDs. FIG. 6 shows a time control circuit 10 used in the second embodiment of the present invention. In FIG. 6, an inverter 103 is added to the circuit shown in FIG. 5. Therefore, the output Q is inverted by the inverter 103. Outputs from the drivers $D_1$ and $D_2$ shown in FIG. 2 becomes $D_1'$ and $D_2'$ as shown in FIG. 4. The signals $D_1'$ and $D_2'$ shown in FIG. 4 correspond to the case wherein the preset values in the down counters of the time control circuits $10_1$ and $10_2$ are 3 and 2, respectively.

Which one of the embodiments described above is to be adopted can be determined in accordance with the photosensitive characteristics of the photosensitive layer used and is determined in order to minimize the data bit number of the memory 8. In the second embodiment shown in FIG. 6, the luminance of the $LED_1$ is low, and that of the $LED_2$ is high.

The above description has been made with reference to a case of controlling a plurality of dot output elements. However, it is to be noted that the present invention is similarly applicable to a printer head (e.g., an ink-jet printer head) which comprises only a single dot output element. The variations in the mechanical or electrical characteristics of the dot pixel output section are not necessarily caused between more than one output element but can be those occurring within an output image formed by a single output element. In such a case, the drive time of the output element corresponding to such an image portion having variations can be controlled to improve the image quality. For example, even if correction values corresponding to all the output dot pixels are stored in the memory, the economy of the printer is not impaired. In the embodiments described above, 2-bit data is read out from the memory 8. However, the number of data to be read out from the memory 8 can be increased, and correction in a larger number of stages can be performed.

In this manner, the present invention can provide a printer head driver which can easily correct variations in mechanical and electrical characteristics inherent to a dot pixel output section and also such variations which occur over time.

In accordance with the circuit arrangement for storing the correction values of characteristic variations in the memory, correction control is simplified significantly. For example, the present invention may be applied to an image printer and when the operator recognizes an image portion of irregular density, he can easily eliminate such an image portion by rewriting the correction value stored in the memory even if the original cause of the erroneous image portion is not eliminated.

The present invention can provide an inexpensive printer with improved image quality by adopting a circuit arrangement wherein correction data each corresponding to the dot output element is stored in a ROM.

In accordance with the drive characteristics of the dot pixel output section adopted, the control value may control the ON times of all or some of the LEDs or OFF times of all or some of the LEDs. In other words, if the correction value which minimizes the number of bits is stored in a memory, economic advantage is obtained. Therefore, when the present invention is applied to an LED array printer head having a large number of dot output elements, the effect obtainable is significant. Automatic changing of ON/OFF times of LEDs can be performed under the control of a microcomputer or the like.

The correction effect of a physical value to be controlled in the embodiments wherein the variations in the mechanical and electrical characteristics of a dot pixel output section are corrected by controlling ON times of LEDs is applicable to various other types of printer head element or mechanism. Therefore, the printer head driver according to the present invention is general purpose and economical.

In the above embodiments, the light-emission characteristics of a plurality of LEDs are individually corrected. However, the same correction can be performed in units of two adjacent LEDs. Furthermore, instead of correction by means of increasing/decreasing the ON times of the LEDs, the power source for driving the LEDs can be controlled to correct the amount of light emitted thereby.

In order to realize a high-resolution printer, an LED array printer head must have a number of LEDs at high density within a confined length. An attempt has been made to simplify the circuit configuration by dividing a plurality of LEDs of an LED array printer head into blocks of LEDs and sequentially driving these blocks.

This method of correcting the irregular light emission of the LEDs of an LED array printer head by control in units of blocks will now be described.

THIRD EMBODIMENT

Figure 7:
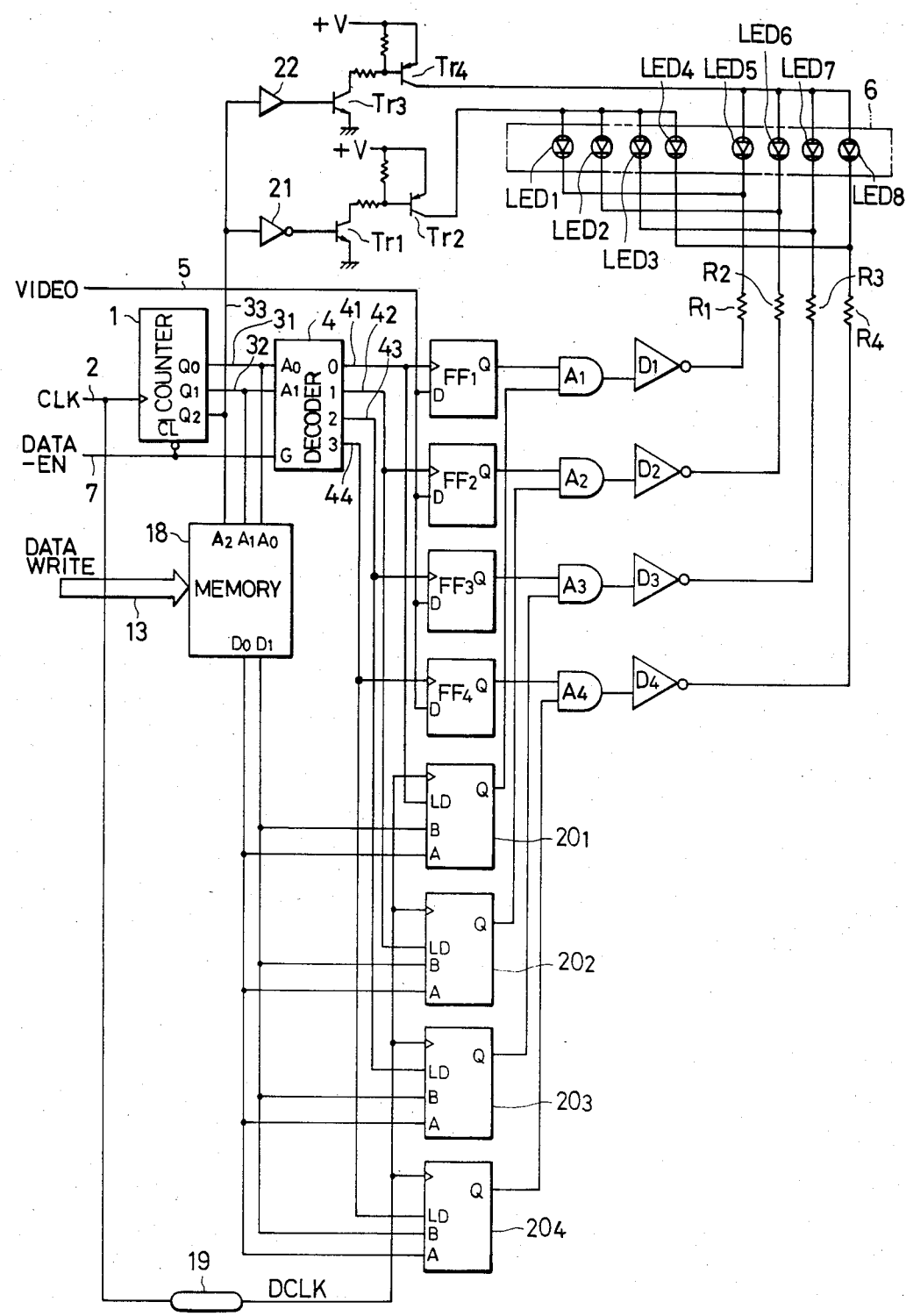
FIG. 7 is a block diagram of an LED array printer head driver according to a third embodiment of the present invention.

FIG. 7 is a block diagram of an LED array printer head driver according to a third embodiment of the present invention. The same reference numerals as in FIG. 1 denote the same parts in FIG. 7, and a detailed description thereof is omitted. Referring to FIG. 7, a memory 18 produces data $D_0$ and $D_1$ for time control in accordance with an address input, i.e., output signals $3_1$ to $3_3$ from a counter 1. A delay circuit 19 delays main scanning clock signals (CLK) 2 for a delay time after which the readout data $D_0$ and $D_1$ from the memory 18 is stabilized. Time control circuits $20_1$ to $20_4$ individually and alternately control the ON times of pairs of LEDs $LED_1$ and $LED_5$, $LED_2$ and $LED_6$, $LED_3$ and $LED_7$, and $LED_4$ and $LED_8$ through AND gates $A_1$ to $A_4$. The individual ON times are set by sequentially setting the common readout data $D_0$ and $D_1$ read out from the memory 18 in the time control circuits $20_1$ to $20_4$ in accordance with latch pulse signals $4_1$ to $4_4$. In this embodiment, a total of eight LEDs are divided into two groups each including four LEDs. However, these numbers are used only for the purpose of explanation. That is, n LEDs are divided into m groups and the m groups of LEDs are separately controlled. An output $Q_2$ from the counter 1 is an upper significant bit of the count. Therefore, the output $Q_2$ from the counter 1 is at "L" level or level "0" while the count of the counter 1 is 0 to 3, and the output $Q_2$ is at "H" level or level "1" while the count of the counter 1 is 4 to 7. This may be seen from the timing chart showing the output $Q_2$ in FIG. 8.

While the output $Q_2$ is at level "0", an output from an inverter driver 21 goes to level "1" to turn on transistors $Tr_1$ and $Tr_2$. At this time, the LEDs $LED_1$ to $LED_4$ are turned on by drivers $D_1$ to $D_4$. While the output $Q_2$ is at level "1", the output from an inverter driver 22 goes to level "1" to turn on transistors $Tr_3$ and $Tr_4$. At this time, the LEDs $LED_5$ to $LED_8$ are turned on by the drivers $D_1$ to $D_4$. Since the count of the counter 1 changes within the range of 0 to 7, the memory 18 receiving the count of the counter 1 as an address input produces readout data each corresponding to the LEDs $LED_1$ to $LED_8$.

Figure 9:
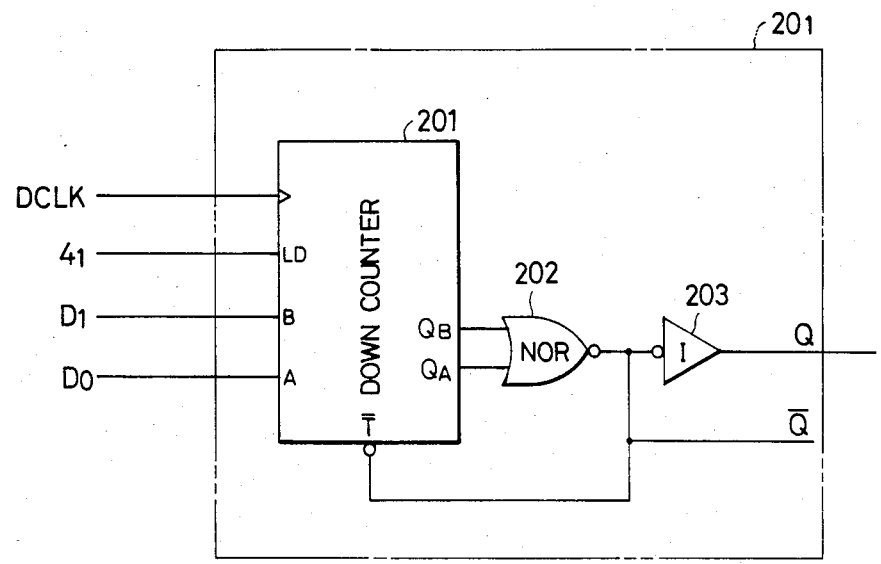
FIG. 9 is a block diagram showing an example of a timing control circuit shown in FIG. 7.

FIG. 9 shows the circuit configuration of the time control circuit $20_1$. The circuit configuration of the circuit $20_1$ is the same as that of the other time control circuits $20_2$ to $20_4$. Referring to FIG. 9, a down counter 201 receives the readout data $D_0$ and $D_1$ from the memory 18 for initialization to set a preset count of the down counter 201, the latch pulse signal $4_1$ for selectively enabling the initialization, and a delayed clock signal DCLK for providing an actual initialization timing after the readout data $D_0$ and $D_1$ are stabilized. The delayed clock signal DCLK also serves as a clock signal for counting down the down counter 201. Unless the initial preset count in the down counter 201 is "0", a signal of level "1" is produced onto one of output terminals $Q_A$ and $Q_B$ thereof. At this time, an output signal from a NOR gate 202 is at level "0", and a down count terminal $\overline{T}$ of the down counter 201 is enabled. A signal Q of level "1" obtained by inversion by an inverter 203 is produced from the time control circuit $20_1$. The down counter 201 starts counting down from the next delayed clock signal. When the count of the down counter 201 reaches "0", the signals of the output terminals $Q_A$ and $Q_B$ are both at level "0", and an output signal from the NOR gate 202 is set at level "1". At this time, the down count terminal $\overline{T}$ of the down counter 201 is deenergized, and the down counter 201 stops counting. At the same time, the output signal Q from the time control circuit goes to level "0" and is kept at level "0" until the next initialization is performed.

Figure 8:
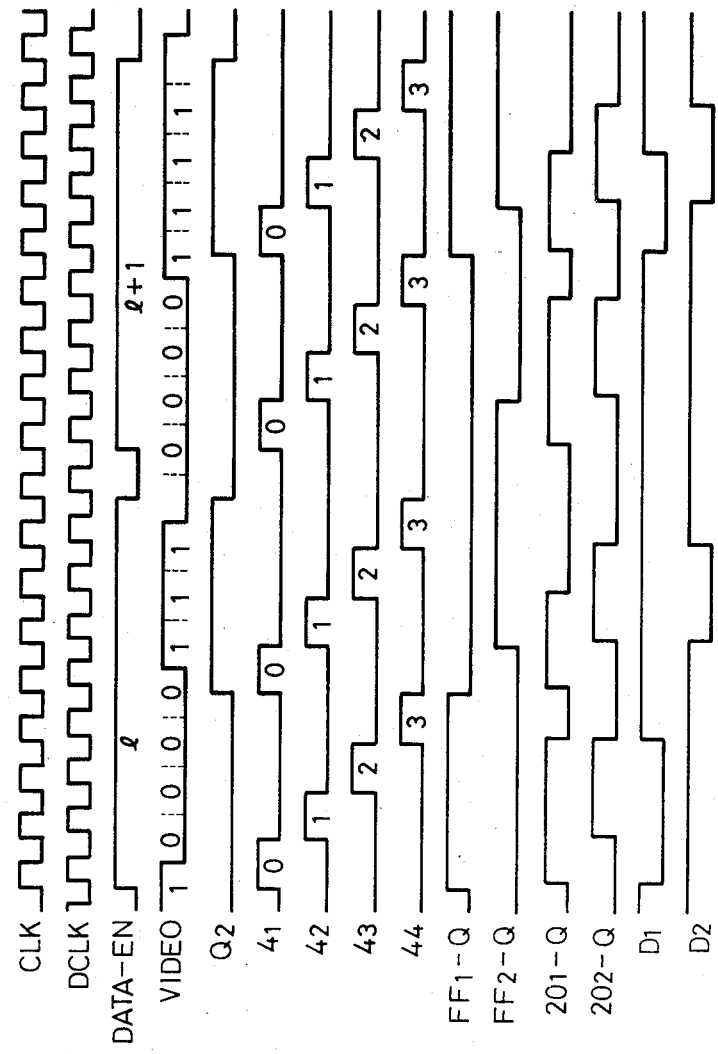
FIG. 8 is a timing chart of the LED array printer head driver of the embodiment shown in FIG. 7.

The mode of operation of the circuit shown in FIG. 7 will be described with reference to the timing chart shown in FIG. 8. The timing chart shown in FIG. 8 shows the phase relationship between the main scanning clock signal (CLK) 2 and the delayed clock signal DCLK obtained by delaying the signal (CLK) 2 by a predetermined delay time. Main scanning is performed in synchronism with a data enable signal (DATA-EN) 7, and is exemplified for lth and (l+1)th scanning lines. For the lth scanning line, a video signal (VIDEO) 5 is an 8-bit pixel signal of "10000111". The video signal for the (l+1)th line is the same but is delayed by one clock time. In the case of this embodiment, a black image corresponds to a video signal of level "1", while a white image corresponds to a video signal of level "0". Latch pulse signals $4_1$ to $4_4$ are obtained by decoding a lower significant bit of the output from the counter 1 and are obtained twice during each main scanning period. The timing chart shown in FIG. 8 also shows the relationship between the latch pulse signals $4_1$ to $4_4$ and the count of the counter 1. An upper bit output $Q_2$ of the counter 1 is supplied as an address to an upper bit of the memory 18, and eight different readout data $D_0$ and $D_1$ are obtained in the main scanning period. The upper bit $Q_2$ of the counter 1 energizes the LEDs $LED_1$ to $LED_4$ and $LED_5$ to $LED_8$ by time division. Therefore, the ON times of the LEDs $LED_1$ to $LED_8$ are individually controlled.

This will be described in more detail hereinafter. For the lth line, the latch $FF_1$ stores the video signal VIDEO at the leading edge of the first latch pulse signal $4_1$, and an output signal ($FF_1$-Q) of the latch $FF_1$ goes to level "1". An output signal ($FF_2$-Q) from the latch $FF_2$ is at level "0" at the leading edge of the first latch pulse signal $4_2$. The readout data $D_0$ and $D_1$ read out from the address 0 of the memory 18 are set in the time control circuit $20_1$ at the time selected by the first latch pulse signal $4_1$. The actual setting timing coincides with the leading edge of the delayed clock signal DCLK. At this timing, an output signal ($20_1$-Q) from the time control circuit $20_1$ goes to level "1". Similarly, an output signal ($20_2$-Q) from the time control circuit $20_2$ goes to level "1" in an interval selected by the first latch pulse signal $4_2$. In this embodiment, since the luminance of the LED $LED_1$ is low, the initial preset value of the counter 201 for the LED $LED_1$ is set to be 3. Since the luminance of the remaining LEDs $LED_2$ to $LED_8$ is an average value, the initial preset value for these LEDs is set to be 2. In the time control circuit, every time the delayed clock signal DCLK is received, the count of the down counter 201 is decremented by 1. Thus, the output signal ($20_1$-Q) from the down counter 201 falls to level "0" at the leading edge of the fourth delayed clock signal DCLK. The output signal ($20_2$-Q) from the down counter falls to level "0" at the leading edge of the fourth delayed clock signal DCLK. These outputs are kept at level "0" until the next initialization is performed. This next initialization is performed in response to the second latch pulse signals $4_1$ and $4_2$. In the printer of this embodiment, the period of main scanning is divided into two intervals, and a single time control circuit is used to control the ON times of different LEDs. Accordingly, the maximum unit time for control is ½ the main scanning period which is determined in accordance with minimum conditions of good sensitivity within such a time interval. This also applies to the case wherein the LEDs are divided into more than two groups for separate control. The AND gate $A_1$ receives the outputs from the latch $FF_1$ and the time control circuit 201. Therefore, when the output from the latch $FF_1$ is at level "1", the output of level "1" from the AND gate $A_1$ is limited in time by the time control circuit $20_1$. While the output from the AND gate $A_1$ is at level "1", the driver $D_1$ is energized to cause a current to flow to the LED $LED_1$. Meanwhile, since the output from the latch $FF_2$ is at level "0", it is not subjected to time control by the time control circuit $20_2$. The output from the latch $FF_2$ is subjected to time control only during control of the ON time of the LED $LED_6$. When the LED $LED_1$ is turned on, it is kept on for a period corresponding to three clocks due to its low luminance. The remaining LEDs $LED_2$ to $LED_8$ are turned on for a period corresponding to two clocks due to their relatively high luminance.

Time control can be performed by complementary control. According to actual complementary control, a time period for not turning on LEDs is ½ the main scanning period which corresponds to four clocks. Since the LED $LED_1$ has a low luminance, a period for deenergizing the LED $LED_1$ is determined to correspond to one clock. In contrast to this, since the LEDs $LED_2$ to $LED_8$ have a relatively high luminance, the OFF time of these LEDs is determined to correspond to two clocks. Therefore, data 1 is read out from the address 0 of the memory 18, while data 2 is read out from the addresses 1 to 7 thereof. In order to achieve this circuit configuration, the output lines of the time control cirouits $20_1$ to $20_4$ are obtained from the output terminal $\overline{Q}$ shown in FIG. 9. Which one of the methods described above is to be adopted can be determined so as to minimize the number of bits for reading out data from the memory 18.

The purpose of this embodiment is to provide a uniform dot image by individual control of ON times of LEDs. If subscanning is stopped during the main scanning period, the light amount received per unit photosensitive area can be rendered uniform by controlling the ON times of the LEDs. If subscanning is performed during main scanning, there will be a difference between areas which are exposed to light. However, when a resultant image is viewed at a distance, it appears uniform in density.

If the irregularities in the light-emission characteristics of LEDs of an LED array printer head are to be effectively corrected with a simple circuit configuration, the LEDs are controlled in a matrix form so that the number of common circuits (LED drivers, time control circuits, and the like) can be increased, so decreasing the total number of circuit components. With such a simple circuit configuration, the correction data stored in the memory 18 for all the LEDs can be effectively used, and the number of common circuits is increased so decreasing the total number of circuit components, thereby providing an inexpensive printer head driver.

With the circuit configuration and control method of the embodiment described above, the quality of a visual image is improved. The ON time control performed in this embodiment can also be applied to other printer heads such as a conventional printer head described above. Referring to FIG. 7, a data write line 13 allows data write from a microcomputer (not shown) to the memory 8. If a ROM storing correction data for each of the head elements is used as the memory 18, the data write line 13 can be omitted. Not only an LED array printer head but also other printer mechanisms and printer elements are subject to variations in characteristics over time. In this embodiment, the memory 18 which allows easy rewriting or updating of the contents under control of a microcomputer or upon manual operation can be adopted as a means for easily correcting such variations in characteristics which may occur over time. Moreover, a processing of decrementation or incrementation by 1 for all the contents in the memory 18 can be performed, thereby allowing the overall density of an image to be decreased or increased while keeping the overall density uniform.

FOURTH EMBODIMENT

Figure 10:
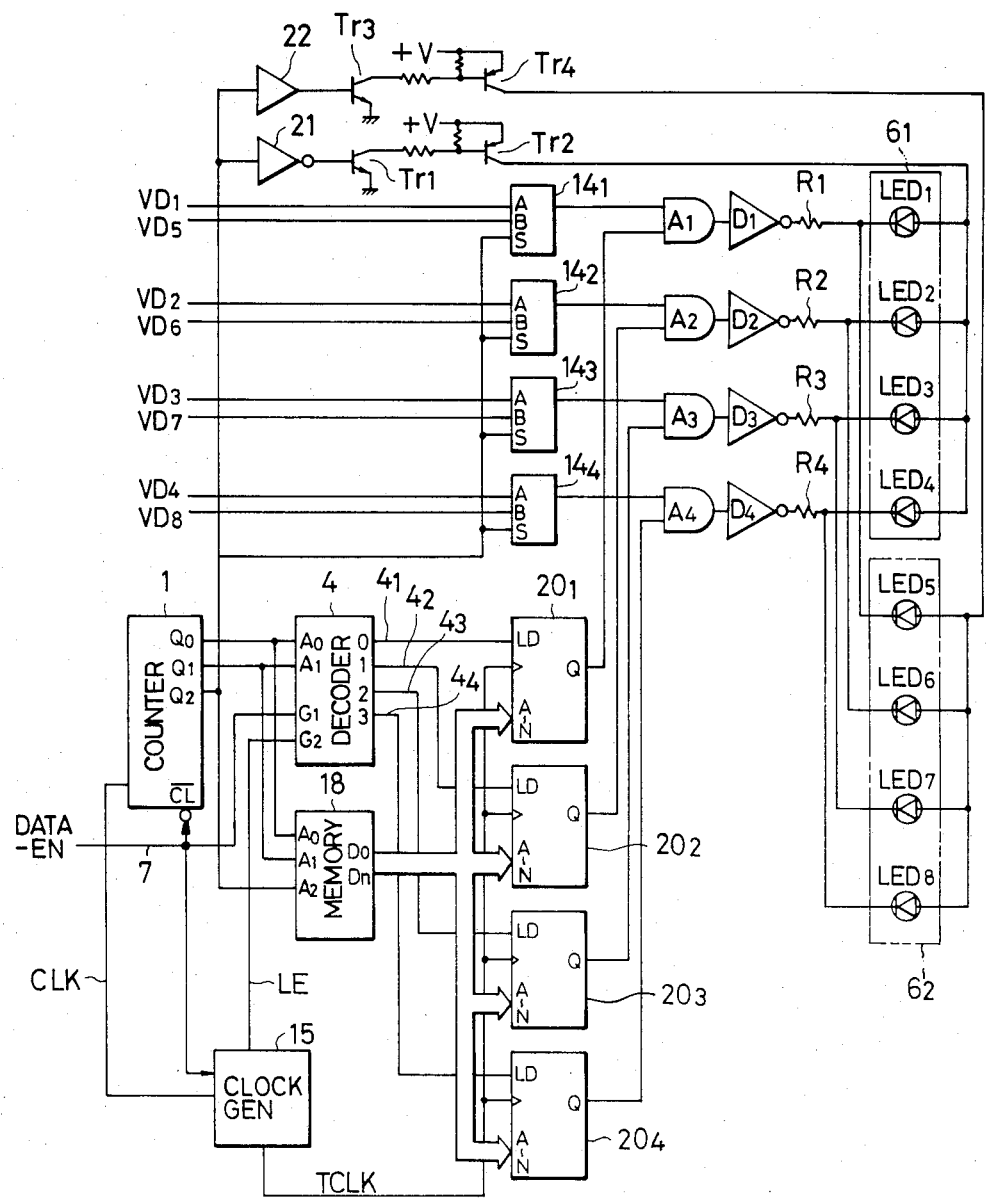
FIG. 10 is a block diagram of an LED array printer head according to a fourth embodiment of the present invention.

FIG. 10 shows an LED array printer head according to the fourth embodiment of the present invention. In this embodiment, ON time control is performed for video data $VD_1$ to $VD_8$ which are 8-bit parallel inputted. In each of selectors $14_1$ to $14_4$, when an input signal to an input terminal S is at level "0", data supplied to an input terminal A is selected and is produced. However, when the input signal to the input terminal S is at level "1", data supplied to an input terminal B is selected and is produced. A clock generator 15 produces clock signals TCLK corresponding to main scanning clock signals CLK in synchronism with a data enable signal (DATA-EN) 7. The number of bits of data $D_0$ to $D_n$ of a memory 18 is increased as compared to that in the above embodiments, so as to allow finer time control. The clock signals TCLK supplied from the clock generator 15 to time control circuits $20_1$ to $20_4$ have a higher frequency than that of the main scanning clock signals CLK. A latch enable gate signal LE having a pulse duration corresponding to one period of the clock signal TCLK is supplied to a decoder 4 so as to synchronize the selective enable time of latch pulse signals $4_1$ to $4_4$ for initialization with the clock signal TCLK. This configuration is used when the printer head driver as described above is applied to an information source from which video data is parallel-outputted. However, although not shown in the drawings, this embodiment is also applicable to dot output elements which are driven simultaneously, for example, to elements of a known wire dot printer head. A case of simultaneously driving elements of a wire dot printer head for 4 dots in place of LEDs will be considered with reference to FIG. 10. According to a conventional technique, the lower input terminals of AND gates $A_1$ to $A_4$ commonly receive a drive pulse of a predetermined pulse duration. Therefore, variations in characteristics of the dot output section are not compensated for. However, according to this embodiment, the input terminals of the AND gates $A_1$ to $A_4$ are individually controlled as can be seen from FIG. 10. If the period of the clock signal CLK is shortened, the decoder 4 completes initialization of the time control circuits $20_1$ to $20_4$ at high speed. Thus, all the printer head elements are driven substantially simultaneously. The counting operation of a counter 1 is stopped after this initialization. The time control circuits $20_1$ to $20_4$ individually control the ON times of the respective head elements in accordance with corresponding preset values so as to compensate for variations in characteristics.

FIFTH EMBODIMENT

Figure 11:
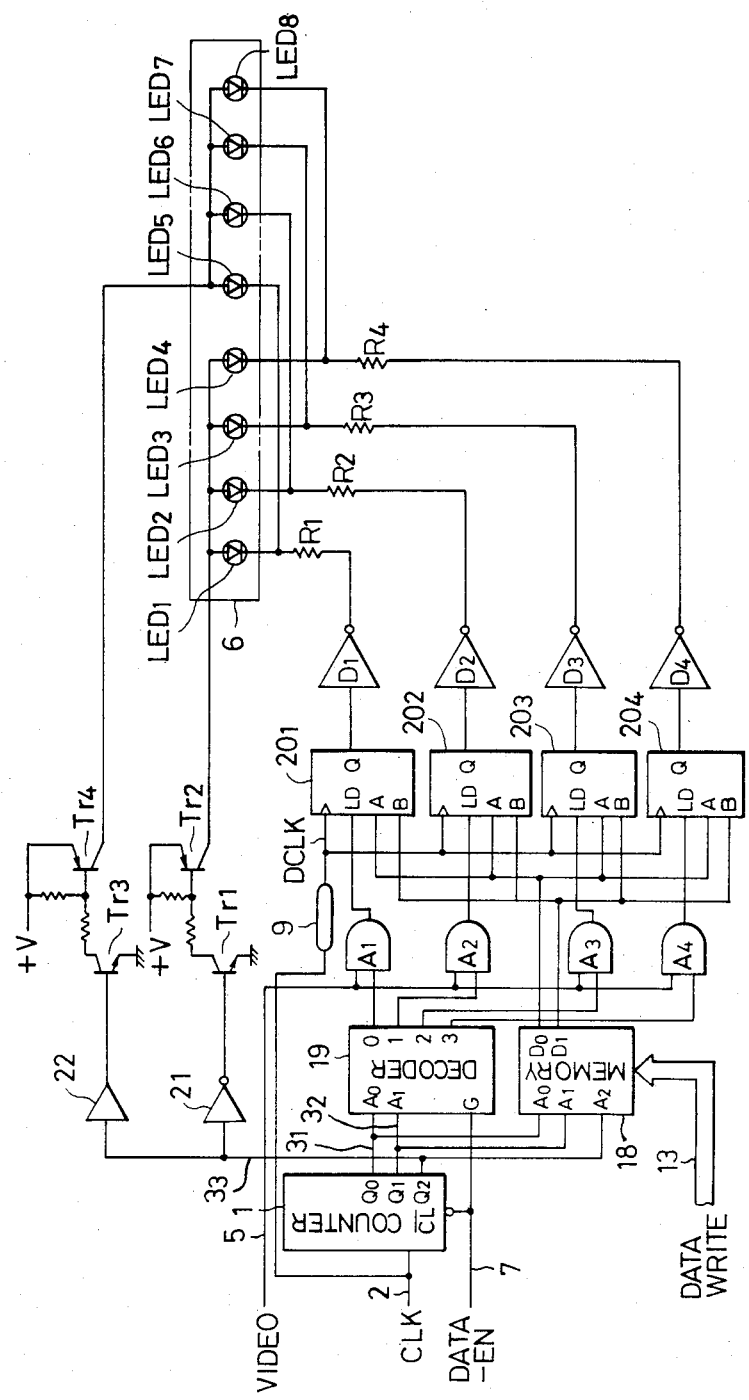
FIG. 11 is a block diagram of an LED array printer head driver according to a fifth embodiment of the present invention.

FIG. 11 shows an LED array printer head driver according to the fifth embodiment of the present invention. In this embodiment, the overall circuit configuration is further simplified as latch flip-flops $FF_1$ to $FF_4$ in the embodiment shown in FIG. 7 are omitted, and their function is performed by time control circuits $20_1$ to $20_4$. In this case, AND gates $A_1$ to $A_4$ are arranged at the input sides of the time control circuits $20_1$ to $20_4$. The time control circuits $20_1$ to $20_4$ are turned on only for a period wherein a video signal (VIDEO) 5 is at level "1".

In the printer head driver according to the fifth embodiment of the present invention, even if the dot pixel output elements have variations in mechanical or electrical characteristics from one to another or over time, they can be easily compensated for. If correction values for correcting such variations are stored in a memory, correction control is simplified. Furthermore, if the correction values are stored in the memory in a minimum number of bits in accordance with the characteristics of the dot pixel output elements, an economical advantage is obtained. This is notably so if such a circuit arrangement is applied to an LED array printer head which has a large number of dot pixel output elements. The present invention also allows both automatic correction of variations in characteristics of dot pixel output elements without impairing the uniform density of an image, and automatic changing of density under the control of a microcomputer.

In the first to fifth embodiments described above, the ON times of LEDs are controlled by gating through AND gates image signals or signals for driving the LEDs in accordance with the correction data $D_0$ and $D_1$ read out from the memory 18. Furthermore, the image formed by ON/OFF control of the LEDs was a binary or black and white image.

However, an image such as a picture involves halftone portions or gray levels between black and white.

A dot output device expresses such gray levels with a different number of dot output pixels within a unit area. For example, it has been proposed to constitute one pixel with a plurality of dot pixel outputs and to variably control the black dot output density, for example, so as to provide macroscopic gray levels or a halftone image.

However, this method impairs the image resolution. As may be apparent from the description of the first to fifth embodiments, since the ON times of the respective LEDs constituting an LED array printer head can be individually controlled, this may be utilized to provide a halftone image.

An embodiment for realizing halftone image production will be described below.

SIXTH EMBODIMENT

Figure 12:
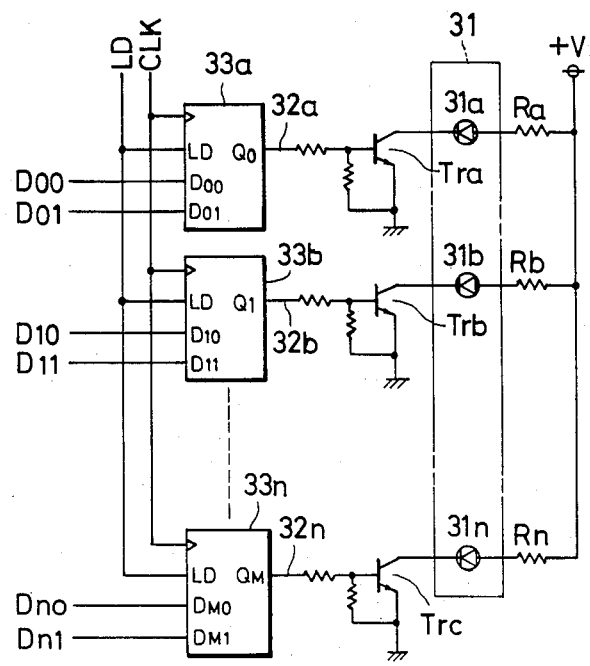
FIG. 12 is a circuit diagram of a printer head driver according to a sixth embodiment of the present invention.

FIG. 12 is a circuit diagram of a head drive section in a printer head driver according to the sixth embodiment of the present invention. An LED array printer head 31 has LEDs 31a to 31n and is used as a printer dot head. Current-limiting resistors Ra to Rn are series-connected to the LEDs 31a to 31n. Transistors Tra to Trn constitute drivers for the respective LEDs 31a to 31n. When the signals on signal lines 32a to 32n are at level "1", the transistors Tra to Trn are turned on to turn on the corresponding LEDs 31a to 31n. However, when the signals on the signal lines 32a to 32n are at level "0", the transistors Tra to Trn are turned off to turn off the corresponding LEDs. Head ON time control circuits (to be referred to as control circuits hereinafter) 33a to 33n include down counters which count down from the initial preset values to 0 in response to clock pulse signals CLK. When the counts of the down counters are not 0, the control circuits 33a to 33n produce output signals Q0 to Qn of level "1", respectively. When the counts of the down counters become 0, the control circuits 33a to 33n stop the down counters and produce the output signals Q0 to Qn of level "0". The output signals Q0 to Qn control the head ON times of the respective transistors Tra to Trn as drivers of the LEDs through the signal lines 32a to 32n. In order to set the preset values in the down counters of the control circuits 33a to 33n, weighted values of respective input data signals D00, D01, D10, D11, . . . , Dn0, and Dn1 are set at a timing of the leading edge of the clock pulse CLK when a load signal LD is at level "1".

Figure 14:
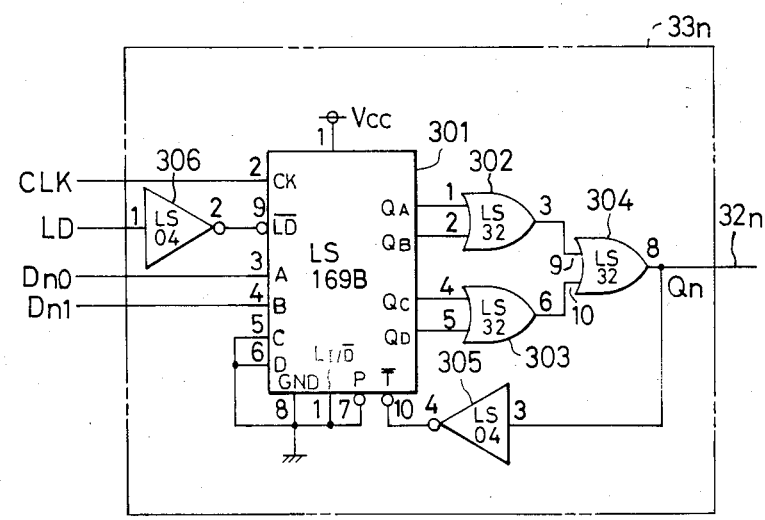
FIG. 14 is a circuit diagram of an example of a counter circuit shown in FIG. 12.

FIG. 14 shows an example of the control circuit shown in FIG. 12. Although FIG. 14 only shows the control circuit 33n, the remaining control circuits are of the same configuration. Referring to FIG. 14, the control circuit 33n has a down counter 301 for counting down from a preset value, OR gates 302 to 304, and inverters 305 and 306. When the preset value is set in the down counter 301, the counter 301 produces a signal of level "1" from one of output, terminals $Q_A$ to $Q_D$ unless the count thereof is 0. When the counter produces a "1", the output signal from the OR gate 304 is at level "1", and produces a signal of level "1" at an output terminal Qn of the control circuit 33n. At the same time, the output signal from the OR gate 304 is inverted through the inverter 305, and the inverted signal enables a down count terminal $\overline{T}$ of the counter 301. The load signal LD which was at level "1" after initialization is inverted to level "0" before the next clock pulse signal CLK is supplied. Therefore, the signal of level "1" supplied through the inverter 306 disables a load terminal $\overline{LD}$ of the counter 301. When the subsequent clock pulse signals CLK are received in this state, the down counter 301 counts down at the leading edge of each clock pulse signal CLK. When the count of the down counter 301 reaches 0, the down counter 301 supplies a signal of level "0" to the output terminal Qn of the control circuit 33n. The terminal $\overline{T}$ of the down counter 301 is then deenergized by the output signal from the inverter 305, and no further counting operations are performed. Therefore, the output Qn of the circuit 33n is kept at level "0" until a value other than 0 is set in the counter 301 at a timing of the next initialization. The control circuit used in this embodiment can comprise a combination of logic circuit elements available from TI, Inc. However, a similar control operation to that performed by the control circuit shown in FIG. 14 can be performed by a different circuit. For example, in order to variably control the time constant of a known one-shot multivibrator, a plurality of resistors are connected in parallel with a time constant determining circuit. The resistor circuits are opened or closed by switching means which are synchronized with the input data signals Dn0 to Dn1. Alternatively, a plurality of resistors are series-connected to a time constant determining circuit, and are individually short-circuited. A control circuit adopting such a circuit configuration may have any other details as long as it can be triggered at a predetermined timing and the enable or disable level of the output signal Qn can be changed in accordance with the input data signal.

Figure 13:
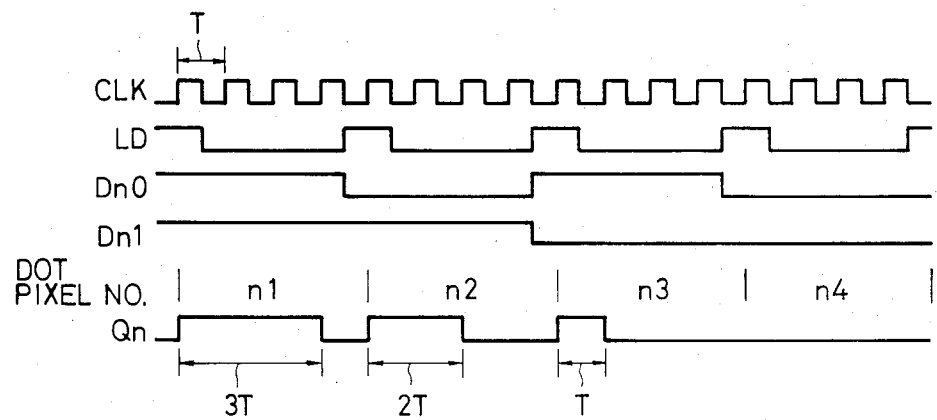
FIG. 13 is a timing chart showing the operation of the printer head driver shown in FIG. 12.

FIG. 13 shows a timing chart of the circuit shown in FIG. 12. Since the driving method of each LED is the same, only the case of the control circuit 33n will be described. In the illustrated case, one dot pixel is formed per 4 periods of clock pulse signals CLK (having the period T). However, this ON/OFF period of the LED is not limited to a 4-clock period. Dot pixel Nos. n1 to n4 indicate the time-serial order of dot pixels formed by n LEDs. The input data signals for initialization in this case are Dn0 and Dn1. The signal Dn0 is a lower-bit signal having less significance, and the signal Dn1 is an upper-bit signal having more significance. When the load signal LD is at level "1", the input data signals Dn0 and Dn1 are loaded in the control circuit 33n at the leading edge of the clock pulse signal CLK. In this embodiment, since the counter 301 is a binary down counter, the initial preset value is 3. Since the count of the counter 301 is a value other than 0, the output Qn is at level "1". Thereafter, every time the clock signal CLK rises, the counter 301 counts down. When the count becomes 0, the down counter 301 stops counting and supplies a signal of level "0" to the output terminal Qn. Therefore, for a period of 3T, the output Qn is at level "1", and the LED 31n is turned on for the period corresponding to three periods of the clock pulse signal CLK. At the timing of the dot pixel No. n2, the initial preset value is 2, and the LED 31n is turned on for a period of 2T, that is, for a time period corresponding to two periods of the clock signal CLK. At the timing of the dot pixel No. n3, the initial preset value becomes 1, and the LED 31n is turned on for a time period corresponding to one period of the clock signal CLK. At the timing of the dot pixel No. n4, the preset value is 0, and the output Qn is not at level "1". Therefore, the LED 31n is not turned on at all. As described above, in this embodiment of the present invention, the LEDs are controlled among a maximum ON time for the respective LEDs is 3T, and other ON times of 2T, T and no ON time. The LED array printer head 31 of this embodiment forms an electrostatic latent image on the photosensitive layer of the rotating drum. If the LEDs 31a to 31n are arrayed parallel to the rotating axis of the drum, an image can be formed by simultaneously driving the array of LEDs 31a to 31n and repeating such simultaneous driving in synchronism with rotation of the drum. More specifically, in this embodiment, the image information for the LED 31a is a pair of input data signals D00 and D01, the image information for the LED 31b is a pair of input data signals D10 and D11, . . ., and the image information for the LED 31n is a pair of input data signals Dn0 and Dn1. When a case is considered wherein the drum is rotated at a constant speed, movement of the photosensitive layer of the drum during a 4T-period assigns a photosensitive layer portion of a predetermined area to the LED 31a. If the photosensitive layer portion is assumed to be substantially rectangular, one side along the rotating axis of the drum has a predetermined length between adjacent LEDs. The other side is given by a moving distance of the photosensitive layer portion within a time period corresponding to four periods of the clock pulse signal CLK. The LED turned on corresponding to the input signals representing a count of 3 exposes about 75% of the area of the photosensitive layer portion. The LED turned on corresponding to the input signals representing a count of 2 exposes about 50% of the photosensitive layer portion. When the value of the input signal is 0, the photosensitive layer is not exposed at all. When latent images having different exposure area ratios are developed and fixed on transfer sheets, an image having four gray levels is obtained. The four gray levels are a darkest black level corresponding to the data signals representing a count of 3, gray levels corresponding to the data signals representing 2 and 1, and a white level corresponding to the input data signals representing 0.

In this embodiment, since the maximum value of the 2-bit input signals is 3, a non-controlled time interval in which the LEDs are not turned on is present in the dot pixel output period corresponding to 4T. However, if the dot pixel output interval is selected to be 3T, no such non-controlled time interval will be present. In other words, a non-controlled time interval can be eliminated if initialization is performed for each clock pulse.

In the above embodiment, all the LEDs 31a to 31n are simultaneously driven. Therefore, all the image data D00, D01, ..., Dn0, Dn1 are prepared at the timing of the load signal LD. Another method will be described below. According to this method, the load signal LD is not commonly supplied to the control circuits 33a to 33n. Instead, the load terminals $\overline{LD}$ of the control circuits 33a to 33n are sequentially and individually biased in a time-serial manner. This is so-called scanning control. With this method, a common memory means is provided from which corresponding image data is read out in synchronism with enabling of the individual control circuits. The common image data read out from the memory means is sequentially loaded to individually control the ON times of the LEDs. Thus, the respective LEDs are scanning-driven and the respective ON times correspond to the loaded image data.

When a latent image is formed on the drum, the drum can be intermittently rotated. In other words, when the LEDs 31a to 31n are turned on for exposure, the drum is stopped. After the exposure is completed, the drum is driven for a distance corresponding to one line before the drum is exposed to the light of image data of the next line. When exposure is performed while the drum is not rotating, the overall unit light-receiving area of the dot pixel is exposed simultaneously. However, the difference in the exposure time provides a gray level in the final image. When the surface of the photosensitive layer is exposed at a suitable luminance and the exposure changes as a function of time (within a saturation region), the final image can have gray levels.

In the embodiment described above, an LED array printer head is used. However, a printer head driver of the present invention can be applied to other types of printer heads to provide gray levels of an output image as long as the size or density of output pixel dots can be changed in accordance with the ON time of the dot generating mechanism.

Furthermore, in the embodiment described above, the time duration signal associated with image data is used as ON times of dot output elements. However, such a time duration signal associated with image data can also be used as OFF times of dot output elements. Thus, the present invention can be similarly applied to cases wherein the latent image exposed to LEDs must be a black or white image. Image data comprising complement numbers of the original image data can be used. Control of the driving times of the dot output elements in accordance with the time duration signal according to the present invention includes both control of ON times of the dot output elements and control of OFF times in accordance with the complement image data.

SEVENTH EMBODIMENT

Figure 15:
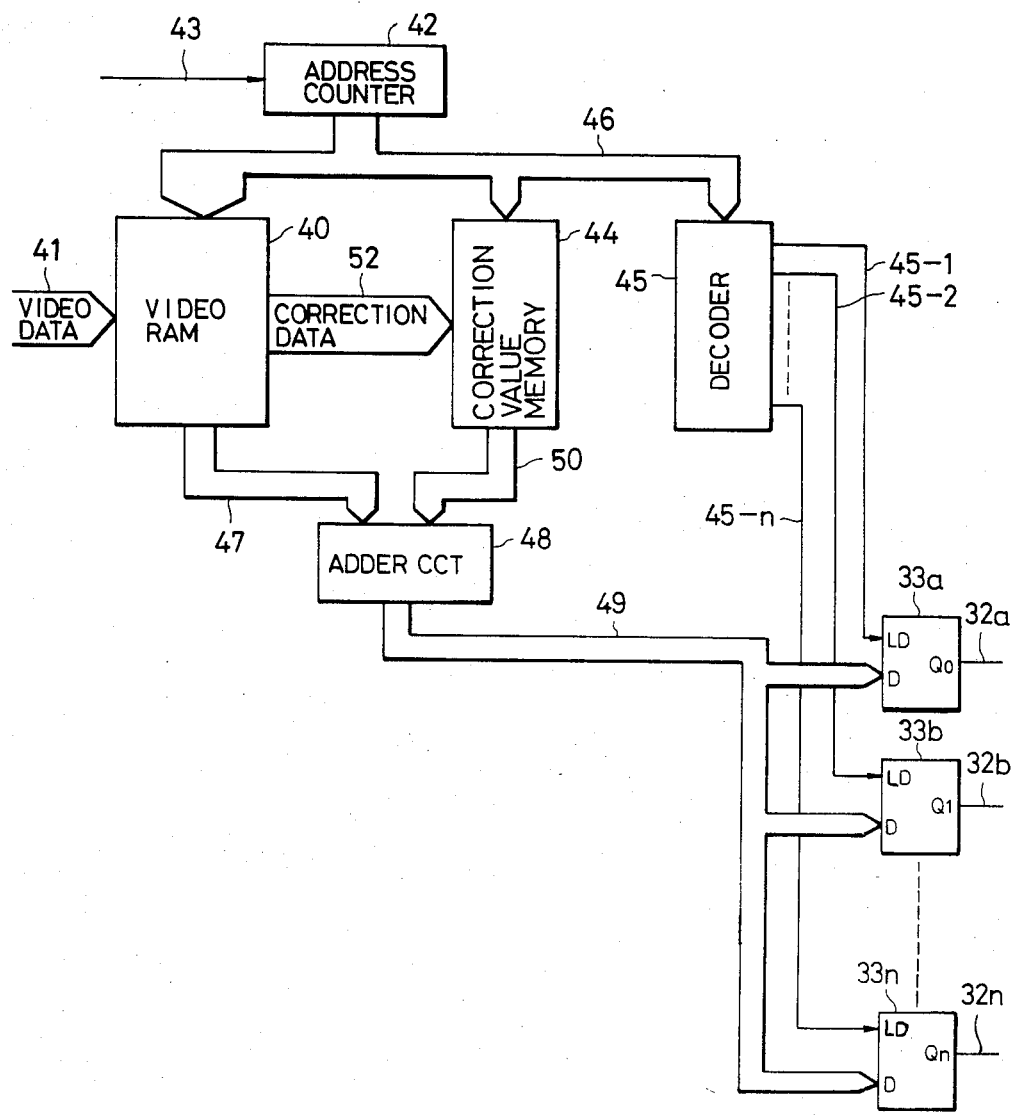
FIG. 15 is a block diagram of a printer head driver of scanning type according to a seventh embodiment of the present invention.

The printer head driver according to this embodiment can be used not only for control to obtain gray levels in an output image but also for correction control to correct variations in characteristics (e.g., the correspondence between the light-emission capacity of the LEDs and the exposure characteristics of the photosensitive layer) of each dot output element and a light-receiving portion, as has been described with reference to the first to fifth embodiments. In order to correct such variations in characteristics, correction values are obtained by driving all the dot output elements for the same time duration and then calculating the variations in the densities of the image obtained. In this case, the correction values for one image are obtained. However, an actual correction effect obtained by correcting variations among a plurality of dot output elements is significant. These correction values correspond to a number of dot output elements and input image data can be preprocessed in accordance with such correction values. More specifically, a table of correction values can be stored in a microprocessor or the like, and the image data is processed by adding or subtracting such correction values. If high-speed processing is required, a method as shown in FIG. 15 can be used. FIG. 15 is a block diagram of a printer head driver of scanning type. Video data from an external device is written in a video RAM 40 for storing pixel data of one image through a data bus 41. A full-bit output supplied from an address counter 42 through an address bus 46 is used as an address of the video RAM 40. Although not shown in the figure, the address counter 42 is synchronized, counted up or reset through a control line 43 during data write of the video data or readout of the video data to be described later. When an image is to be read out from the RAM 40, a lower bit of the address counter 42 is commonly supplied to a correction value memory 44 and a decoder 45. Then, the decoder 45 sequentially produces selection signals 45-1 to 45-n to load terminals LD of control circuits 33a to 33n, respectively. At the same time, the correction value memory 44 supplies a frame of the correction data to be supplied to the control circuits 33a to 33n onto a data bus 50. The video RAM 40 also supplies a frame of the video data to be supplied to the control circuits 33a to 33n onto a data bus 47. When the correction data of one frame for the control circuits 33a to 33n is read out, the correction value memory 44 allows repeated readout of the same frame from the start address. However, in the video RAM 40, the upper bit of the address is updated for each frame and the video data of a different frame is produced. An adder circuit 48 adds each video data and a corresponding correction data. The adder circuit 48 may be replaced with a subtractor which subtracts the correction data from the video data, or with a multiplier or divider which multiplies or divides the video data with a correction coefficient. The corrected video data from the adder circuit 48 is commonly supplied to the control circuits 33a to 33n through a data bus 49. Outputs 45-1 to 45-n from the decoder 45 are selective enable signals for individually fetching the correction video signal outputs. The control circuits 33a to 33n initially preset, in accordance with the corrected video data control, the ON times of the dot output elements through control lines 32a to 32n.

If correction data can be written in the correction value memory 44 through a data bus 52, the correction data can be easily modified and fluctuations in the drive characteristics of the printer head over time can be easily eliminated.

If there is a nonuniformity in the dot pixels constituting an image, there must be a variation in the light-receiving characteristics of the dot output elements at a portion corresponding to this nonuniformity. Thus, the quality of the image can be improved if the ON times of the LEDs corresponding to this portion of nonuniformity are controlled. Even if all the correction values of output dot pixels of an image are stored in a memory, the economy of the driver is not impaired.

According to the driver of the present invention, control for producing a halftone image with dot output elements is performed with a simple circuit configuration. Therefore, a dot printer can be obtained which can produce a halftone image at high speed. If binary image data is converted into ON time control data of the dot head elements, an excellent effect can be obtained with a conventional facsimile system or a computer output device.

Since variations in the driving characteristics of individual dot output elements can be easily corrected, the quality of a dot output image with gray levels can be improved.

What is claimed is:

1. A dot printer comprising:
a recording head having a plurality of recording elements for dot-recording on a recording medium;
driving means for independently driving said plurality of recording elements in accordance with image data;
a plurality of timer means, each of said timer means being arranged for measuring a time that is set according to a recording characteristic of an associated one of said plurality of recording elements; and
correcting means for correcting a dot recording state of each of said plurality of recording elements, said correcting means being operable to control the driving time of each of said plurality of recording elements in accordance with a timing operation of the associated one of said plurality of timer means.

2. A dot printer according to claim 1, further comprising memory means for storing recording characteristics of each of said plurality of recording elements, said plurality of timer means being arranged to be set according to the recording characteristics stored in said memory means.

3. A dot printer according to claim 1, wherein said correcting means individually increments or decrements ON times of said plurality of recording elements.

4. A dot printer according to claim 1, wherein said recording head has a plurality of light-emitting elements as said plurality of recording elements, and said recording medium is a photosensitive body.

5. A dot printer comprising:
a recording head having a plurality of recording elements for dot-recording on a recording medium;
driving means for sequentially driving each group of a predetermined number of recording elements of said plurality of recording elements;
memory means for storing correction factors for said plurality of recording elements;
latching means for latching a predetermined number of correction factors, each corresponding to a group of a predetermined number of recording elements to be driven by said driving means; and
correcting means for correcting the driving of corresponding recording elements based on the correction factors latched by said latching means.

6. A dot printer according to claim 5, wherein said driving means drives said plurality of recording elements in accordance with image data.

7. A dot printer according to claim 5, wherein said correcting means individually increments or decrements ON times of said plurality of recording elements.

8. A dot printer according to claim 5, wherein said recording head has light-emitting elements as said plurality of recording elements, and said recording medium is a photosensitive body.

9. A dot printer according to claim 8, wherein said plurality of recording elements are light-emitting elements capable of emitting light upon being energized, and said recording medium is a photosensitive body.

10. A dot printer comprising:
a recording head having a plurality of recording elements for dot-recording on a recording medium;

entering means for entering image data indicating operation or non-operation of each of said plurality of recording elements;

memory means for storing time data as to an operational time for each of said plurality of recording elements; and driving means for independently and selectively driving said plurality of recording elements based on the entered image data, said driving means being operable to control an operational time for said recording elements based on the image data in accordance with the time data stored in said memory means.

11. A dot printer according to claim 5, wherein said correcting means is operable to control the operating time of the corresponding recording elements based on the correction factors latched by said latching means.

12. A dot printer according to claim 10, wherein said driving means individually controls ON times of said plurality of recording elements.

13. A dot printer according to claim 10, wherein said driving means is operable based on the time data read out from said memory means in synchronism with entry of the image data from said entering means.

* * * * *